United States Patent
Shimizu

(10) Patent No.: US 7,405,777 B2
(45) Date of Patent: Jul. 29, 2008

(54) BACK LCD IMPACT ABSORBING STRUCTURE OF ELECTRONIC APPARATUS AND ELECTRONIC APPARATUS HAVING THE STRUCTURE

(75) Inventor: Masahito Shimizu, Tokyo (JP)

(73) Assignee: NEC Corporation (JP)

( * ) Notice: Subject to any disclaimer, the term of this patent is extended or adjusted under 35 U.S.C. 154(b) by 574 days.

(21) Appl. No.: 10/985,959

(22) Filed: Nov. 12, 2004

(65) Prior Publication Data
US 2005/0141187 A1    Jun. 30, 2005

(30) Foreign Application Priority Data
Dec. 25, 2003    (JP)    ............... 2003-430819

(51) Int. Cl.
*G02F 1/1333*    (2006.01)
*G09F 9/00*    (2006.01)

(52) U.S. Cl. ...................... 349/58; 349/60; 349/149; 455/575.3

(58) Field of Classification Search .................. 349/57, 349/58, 59, 60, 73, 74, 149, 150, 151, 152; 361/680, 681, 683; 379/433.04, 433.11, 379/440; 455/566, 575.1, 575.3, 575.8
See application file for complete search history.

(56) References Cited

U.S. PATENT DOCUMENTS 6,353,465 B1    3/2002    Hashimoto et al.
6,982,698 B2 *    1/2006    Shimizu ..................... 345/156
2003/0063041 A1    4/2003    Kurashima et al.

FOREIGN PATENT DOCUMENTS

| JP | 2000-122037 | 4/2000 |
| JP | 2002-229006 | 8/2002 |
| JP | 2003-241170 | 8/2003 |

OTHER PUBLICATIONS

Partial computer-generated English translation of JP 2003-241170, Aug. 2003.*
European Search Report dated Apr. 22, 2005.

* cited by examiner

*Primary Examiner*—Dung T. Nguyen
*Assistant Examiner*—Tai Duong
(74) *Attorney, Agent, or Firm*—Dickstein, Shapiro, LLP.

(57) ABSTRACT

This invention provides an electronic apparatus having a back display portion and a back LCD impact absorbing structure capable of preventing a front LCD from being broken through a back LCD by a load applied from a rear cover. A rear cover has a back screen attaching portion to which a back screen is attached and a back LCD display window opened by being surrounded by the back screen attaching portion on the surface and a back dustproof cushion on the back of the cover. The longitudinal one side in four sides of a back LCD display window which forms a cutout portion is broadened like a half-moon shape and thereby, a direct influence on this portion of a back LCD due to an external force added to the rear cover is moderated.

9 Claims, 3 Drawing Sheets

Section A-A

BACK LCD IMPACT ABSORBING STRUCTURE OF ELECTRONIC APPARATUS AND ELECTRONIC APPARATUS HAVING THE STRUCTURE

BACKGROUND OF THE INVENTION

1. Field of the Invention

The present invention relates to an electronic apparatus having an LCD at both sides, particularly to a back LCD impact absorbing structure and an electronic apparatus having the structure.

2. Description of the Prior Art

A conventional electronic apparatus having an LCD such as a cellular phone is constituted by an LCD frame to which both sides an LCD having an LCD flexible board and a printed wiring board serving as a circuit board are fixed. The LCD frame is held between a front case forming a housing and a rear cover and a screen for displaying an LCD picture is set to the front case. Recently, not only a front case but also a rear cover are set to a display face and a configuration in which an LCD is set to the surface and the back is practically used. In the case of the both-side-type conventional configuration, the back display window has a rectangle corresponding to a back LCD and the periphery of the display window faces the periphery of the back LCD through a dustproof cushion.

The back LCD is housed in a guide rib set to the LCD frame held by the front case. By forming the guide rib into a structure which does not directly or indirectly contact with the rear cover and the back screen, a back LCD fixing structure is disclosed which a load from the back screen side is not directly added to a guide member. (See Patent Document 1.)

[Patent Document 1] Japanese Patent Laid-Open No. 2000-122037

BRIEF SUMMARY OF THE INVENTION

In the case of this conventional configuration, the back display window is a rectangle corresponding to the back LCD and its periphery faces the periphery of the back LCD through the dustproof cushion. Therefore, when an external force for deforming a rear cover having a comparatively high rigidity is added from the back screen side set to the display window of the rear cover, a problem occurs that a rear cover on the periphery of the display window having a low rigidity is deformed because an opening is formed and the force is directly conducted to the back LCD through the back LCD dustproof cushion, and the front LCD is broken by a load added from a position nearby the center of a back LCD which is then most easily deflected.

The back LCD fixing structure disclosed in Patent Document 1 is a structure in which a guide rib does not directly or indirectly contact with a rear cover or back screen. However, a dustproof cushion is set between the back screen and back LCD and a load added to the back screen is contacted to the back LCD through the dustproof cushion.

It is an object of the present invention to provide an electronic apparatus having a back display portion and a back LCD impact absorbing structure capable of preventing a front LCD from being broken due to a load applied from a rear cover through the back LCD.

The back LCD impact absorbing structure of an electronic apparatus of the present invention is an LCD dustproof structure of an electronic apparatus including a first case having a front LCD display window and a second case having a back LCD display window and on which a housing is formed in accordance with engagement with the first case, in which a front LCD set to the first case, a back LCD set to the second case, and a printed wiring board having an electronic component and wiring for LCD control, and an LCD unit to be built in the housing are included, a back screen is attached to the periphery of the back LCD display window on the surface of the second case, a back dustproof cushion for dustproof between the back screen and the back LCD is attached to the periphery of the back LCD display window on the back, and an outward-broadened cutout portion for moderating the direct influence of an external force added to the second case on the back LCD is formed on longitudinal one side in four sides on which the back LCD display window on the surface of the second case is formed.

It is allowed that the cutout portion is formed like a half-moon shape or a rectangle. Moreover, it is characterized that the front LCD is set to a face opposite to the back LCD.

It is characterized that an electronic apparatus of the present invention has a back LCD impact absorbing structure. It is allowed that the electronic apparatus is a cellular phone and the cellular phone is foldaway.

A back LCD impact absorbing structure of the present invention has an advantage that a front LCD is prevented from being broken through a back LCD by a force added to the back LCD from a rear cover in an electronic apparatus having a back display portion. This is because a longitudinal one side of a back LCD display window of the rear cover is broadened outward like a half-moon shape, even if a load is applied to the rear cover surrounding the back LCD, the deformation of the central portion of a longitudinal side most deformed decreases and thereby, a load applied to the surface of the back LCD through a dustproof cushion is moderated and a load applied to a front LCD through the back LCD is also moderated.

BRIEF DESCRIPTION OF THE DRAWINGS

FIGS. 1A and 1B are schematic perspective views of a foldaway cellular phone of an embodiment of the present invention, in which FIG. 1A is a front LCD side when opened and FIG. 1B is a back LCD side when folded;

FIGS. 2A and 2B are schematic perspective views of the upper housing in FIG. 1, in which FIG. 2A is a perspective view viewed from the back side and FIG. 2B is a perspective view viewed from the front LCD side of an LCD unit; and FIGS. 3A and 3B are illustrations of folded cellular phone, in which FIG. 3A is a top view viewed from the back LCD side and FIG. 3B is a sectional view taken along the line A-A in FIG. 3A.

DETAILED DESCRIPTION OF THE PREFERRED EMBODIMENTS

Figure 1A:
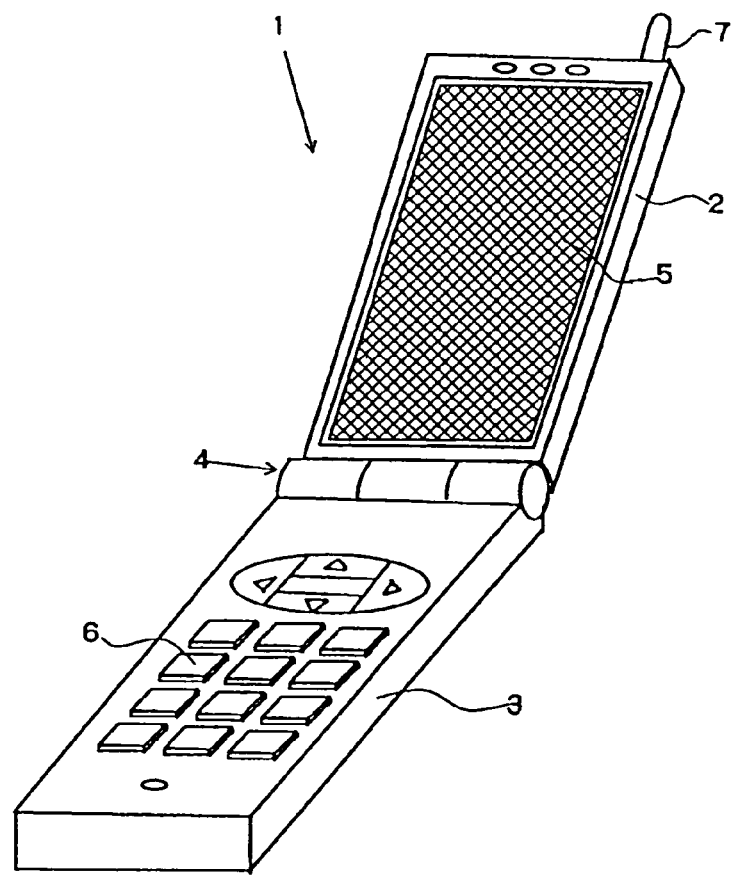
Figure 1B:
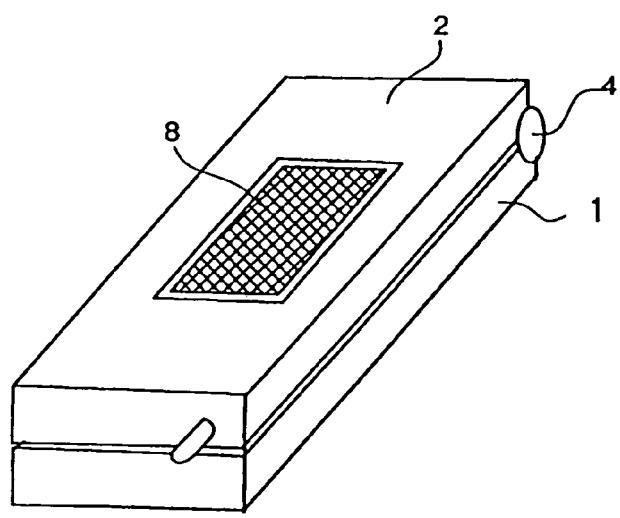
Figure 2A:
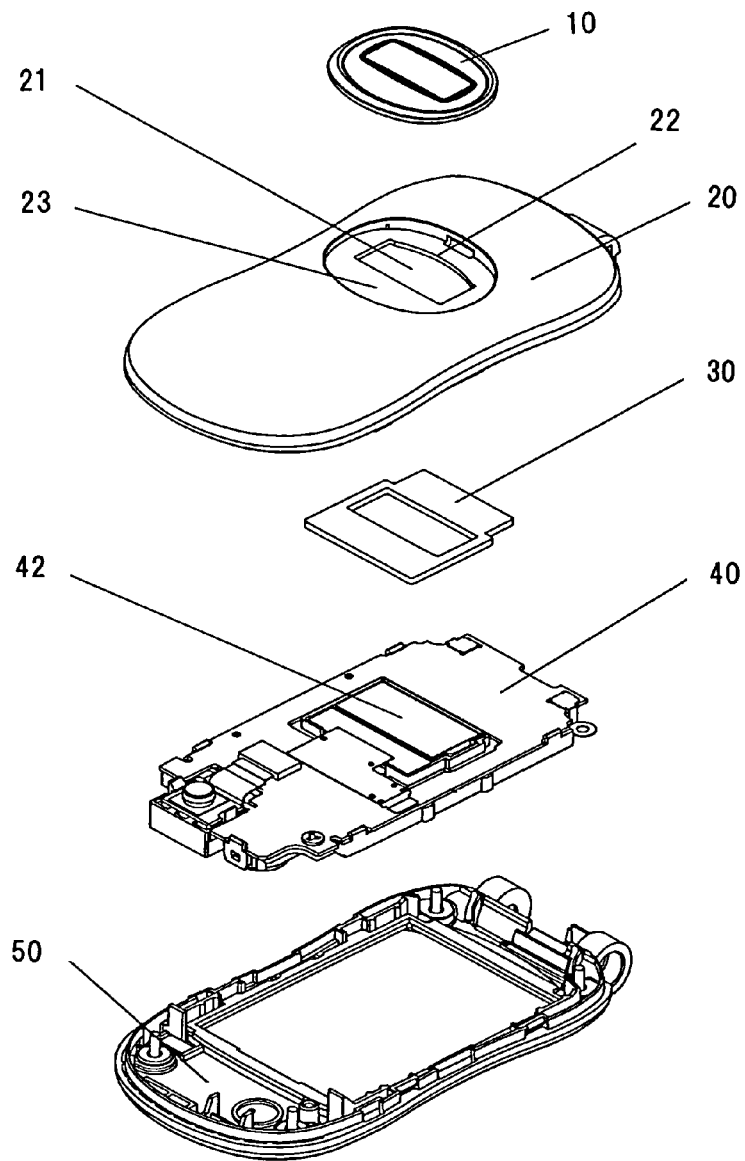
Figure 2B:
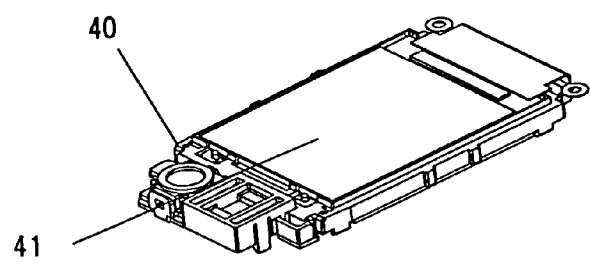
Figure 3A:
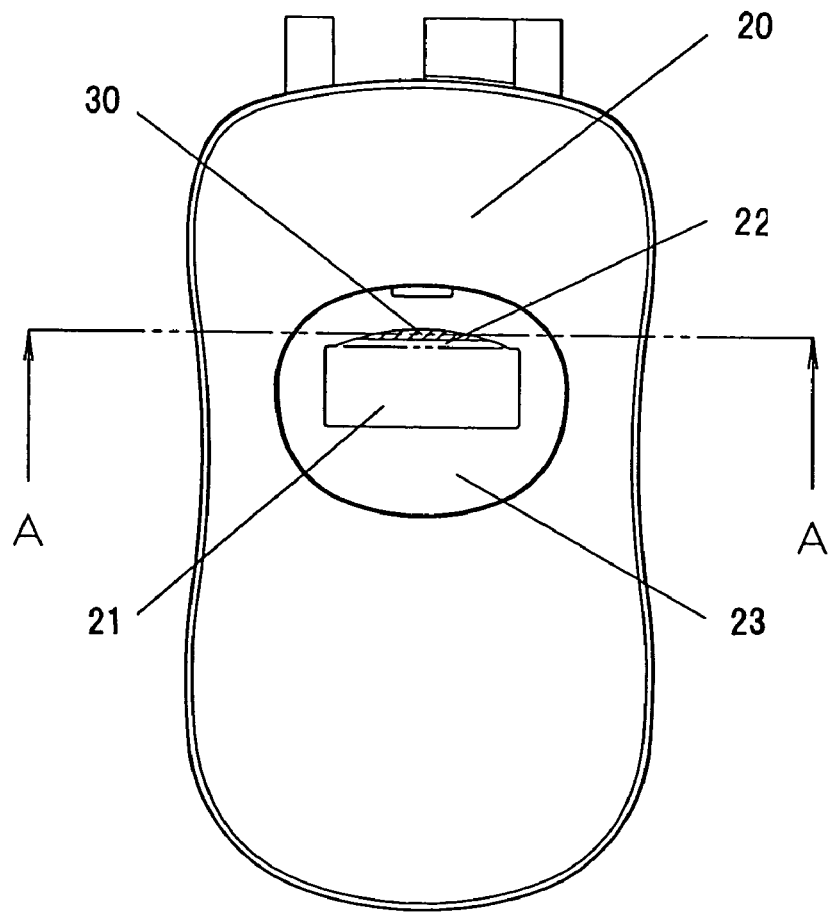
Figure 3B:
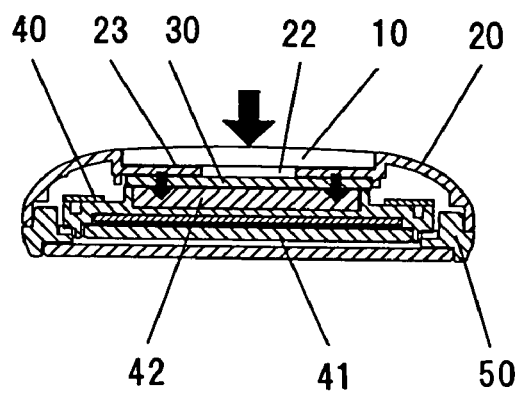

Then, an embodiment of the present invention is described below by referring to the accompanying drawings. FIGS. 1A and 1B are a schematic perspective views of a foldaway cellular phone of an embodiment of the present invention, in which FIG. 1A is the opened-front-LCD side and FIG. 1B is the folded-back-LCD side. FIGS. 2A and 2B are schematic exploded perspective views of the upper housing in FIG. 1, in which FIG. 2A is a perspective view viewed from the back side and FIG. 2B is a perspective view viewed from the front-LCD side of an LCD unit. FIGS. 3A and 3B are illustrations of folded cellular phone, in which FIG. 3A is a top view viewed from the back-LCD side and FIG. 3B is a sectional view taken along the line A-A in FIG. 3A.

As shown in FIGS. 1A and 1B, the foldaway cellular phone 1 is constituted by an upper housing 2, lower housing 3, a hinge connecting portion 4 for connecting the upper housing 2 and the lower housing 3 so that they can be folded, and an external antenna 7, in which a front display 5 for displaying a picture is set to one face of the upper housing 2, a back display 8 is set to the opposite face, and a key button 6 for inputting character information and control information is set to the lower housing.

As shown in FIG. 2, the upper housing 2 has a back screen 10, a rear cover 20, a back dustproof cushion 30, an LCD unit 40, and a front case 50.

The rear cover 20 has a back screen attaching portion 23 and a back LCD display window 21 opened by being surrounded by the back screen attaching portion 23 on the surface and a not-illustrated back dustproof cushion attaching portion on the back, in which the back screen 10 is attached to the back screen attaching portion 23 and the back dustproof cushion 30 is attached to the dustproof cushion attaching portion.

The back LCD display window 21 is formed on the back screen attaching portion 23 of the rear cover 20. The longitudinal one side in four sides of the back LCD display window 21 is formed to be broadened outward like a half-moon shape. The form of the back LCD display window 21 is a feature of the present invention.

In the case of the LCD unit 40, a back LCD 42 is set to the face at the rear cover side, a front LCD 41 is set to the front case side, and a printed wiring board is set to the middle to control the back and front LCDs. The LCD unit 40 is fixed between the rear cover 20 and front case 50 when assembled.

A front screen is set to the front case 50 and a not-illustrated front dustproof cushion is set between the front screen and the front LCD 41 fixed to the LCD unit 40.

As described above, it is characterized in the case of this embodiment that the cutout portion 22 is formed in which longitudinal one side in four sides of the back LCD display window 21 is broadened outward like a half-moon shape.

A conventional back LCD display window is formed like a rectangular opening similarly to the case of a back LCD. Therefore, an external force added to a portion nearby the back LCD display window of a rear cover deforms the central portion of one side in four sides on which the back LCD display window is formed. The external force is directly added to the back LCD through a back dustproof cushion. Further, the external force is added to a front LCD via an LCD unit to break the front LCD inferior in strength because it has a large size.

In the case of this embodiment, the cutout portion 22 is formed in which longitudinal one side in four sides of the back LCD display window 21 is broadened like a half-moon shape.

In the case of a conventional example, when an external force is added, the central portion of the major side of the back LCD display window is greatly deformed.

On the contrary, since the central portion of the major side of the back LCD display window in the present invention is backed, the deformation of the central portion of that decreases.

Then, the cutout portion 22 does not directly add a large force to the back LCD 42 and the force is dispersed, even if the rear cover 20 is deformed.

Therefore, a force to be added to the back LCD 42 is decreased compared to the case of the conventional example and therefore, the LCD unit 40 is prevented from being broken even if the force is conducted to the front LCD 41 via the LCD unit 40.

In this case, description is made by assuming that the cutout portion 22 is a half-moon shape. However, any structure can be used as long as the structure can restrain a deformation value due to an external force and it is allowed that the cutout portion 22 is formed into a rectangular shape.

Then, assembling of the upper housing 2 of the foldaway cellular phone of this embodiment is described below.

First, the back dustproof cushion 30 is set to a not-illustrated back dustproof cushion attaching portion set to the back of the rear cover 20.

Then, the LCD unit 40 in which the back LCD 42, front LCD 41, and not-illustrated printed wiring board are built is built in the front case 50.

Then, the rear cover 20 is set to the front case 50. And, the back screen 10 is attached to the back screen attaching portion 23 of the rear cover 20. And then, the assembling of the upper housing 2 is completed.

Then, functions of the impact absorbing structure of the back LCD 42 of this embodiment are described. Because longitudinal one side of the back LCD display window 21 surrounded by the back screen attaching portion 23 of the rear cover 20 is broadened outward like a half-moon shape and serves as the cutout portion 22, even if a load is applied to the portion of the rear cover 20 surrounding the back LCD display window 21, a deformation value decreases because the center of a most-deformed longitudinal side is backed and a load applied to the surface of the back LCD 42 through a dustproof cushion is moderated because the cutout portion 22 is deviated from the center of the back LCD 42, and a load applied to the front LCD 41 through the back LCD 42 is also moderated.

A foldaway cellular phone is described above as an example. However, the invention is not limited to the foldaway cellular phone, but it is also allowed to use an integrated-type cellular phone which can be widely applied as the impact absorbing structure of the back LCD of an electronic apparatus for performing display by the back LCD.

What is claimed is:

1. An LCD dustproof structure of an electronic apparatus including a first case having a front LCD display window and a second case having a back LCD display window and on which a housing is formed in accordance with engagement with the first case, comprising:
   an LCD unit which includes a front LCD set to the first case, a back LCD set to the second case, and printed wiring board having an electronic component and a wiring for LCD control and which is built in the housing; wherein
   a back screen is attached to a planar portion of a surface of the second case which overlaps the back LCD, and a back dustproof cushion for dustproof between the back screen and the back LCD is attached to the periphery of the back LCD display window on the back, and
   a cutout portion formed in the planar portion of the surface of the second case for moderating the direct influence of an external force applied to the second case on the back LCD, the cutout portion being formed as one side of the back LCD display window.

2. The LCD dustproof structure of an electronic apparatus according to claim 1, wherein
   the cutout portion is formed like a half-moon shape.

3. The LCD dustproof structure of an electronic apparatus according to claim 1, wherein
   the front LCD is set to a face opposite to the back LCD.

4. The LCD dustproof structure of an electronic apparatus according to claim 1, wherein
   the cutout portion is formed in a convex shape.

5. An electronic apparatus including a first case having a front LCD display window and a second case on which a housing is formed in accordance with engagement with the first case, comprising:
- an LCD unit which includes a front LCD set to the first case, a back LCD set to the second case, and a printed wiring board having an LCD control electronic component and a wiring and which is built in the housing; wherein
- a back screen is attached to a planar portion of a surface of the second case which overlaps the back LCD, and a back dustproof cushion for dustproof between the back screen and the back LCD is attached to the periphery of the back LCD display window on the back, and
- a cutout portion formed in the planar portion of the surface of the second case for moderating the direct influence of an external force applied to the second case on the back LCD, the cutout portion being formed as one side of the back LCD display window.

6. The electronic apparatus according to claim 5, wherein the cutout portion is formed like a half-moon shape.

7. The electronic apparatus according to claim 5, wherein the front LCD is set to a face opposite to the back LCD.

8. The electronic apparatus according to claim 5, wherein the electronic apparatus is a cellular phone.

9. The electronic apparatus according to claim 8, wherein the cellular phone is foldaway.

* * * * *